INVENTOR
Roger MATTHEY
By
    Agents

United States Patent Office 3,112,964
Patented Dec. 3, 1963

3,112,964
SHOCK-ABSORBER BEARING FOR ARBORS OR PIVOTS OF SMALL MECHANISMS
Roger Matthey, Le Sentier, Switzerland, assignor to Parechoc S.A., Le Sentier, Switzerland, a firm of Switzerland
Filed July 10, 1962, Ser. No. 208,733
Claims priority, application Switzerland July 11, 1961
4 Claims. (Cl. 308—158)

This invention relates to a shock-absorber bearing for arbors or pivots of small mechanisms.

Said bearing is characterised in that it comprises a bearing block through which the said arbor or pivot passes, said block resting in a seat formed by a surface of revolution contained in a bearing support, and in that the said block is kept applied to the said seat by a resilient device which acts on it through an intermediate part which, on the one hand, has a cylindrical part by means of which it is guided to be axially slidable without rocking in the bearing support and, on the other hand, a plane bearing surface perpendicular to the bearing axis, by which it bears on the block which thus moves parallel to itself without rocking, axial abutment of the arbor or pivot being produced by means which are independent of the said block and its return system.

The accompanying drawing shows two embodiments of the invention by way of example.

Figure 1:
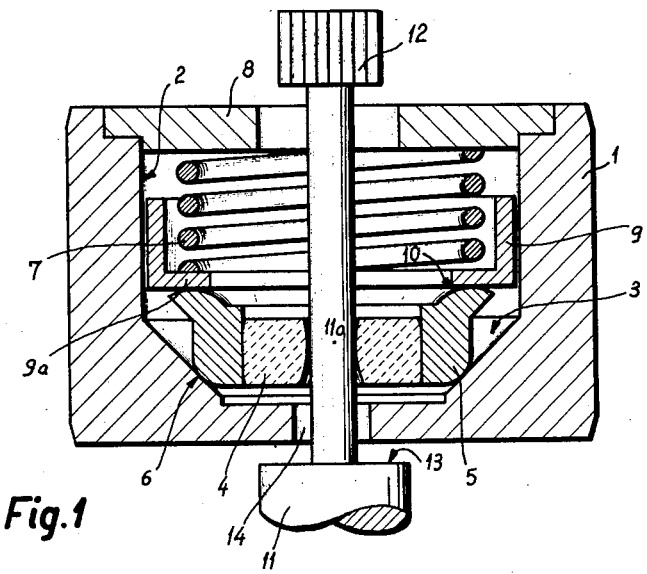
Figure 2:
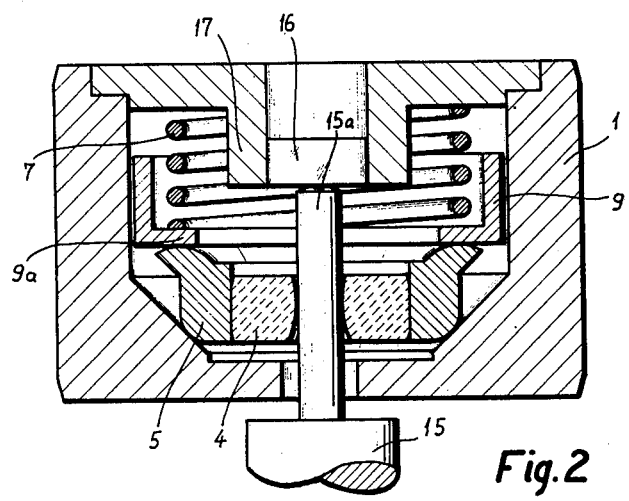

FIGS. 1 and 2 are two axial sections of two embodiments of shock-absorber bearings for the arbors or pivots of small mechanisms.

The bearing shown in FIG. 1 comprises a support 1 intended to be fitted into the frame of the device on which the bearing is mounted. A cylindrical recess 2 is formed inside the support 1 and has a frusto-conical seat 3 intended to receive a block formed by a drilled jewel 4 surrounded by an in-setting 5. The in-setting has a bearing surface 6 formed by a part of spherical surface, by which it rests on the seat 3.

The block is applied to the seat 3 by a coil spring 7 bearing at one end against a bushing 8 forced into the bearing support 1, and at the other end an intermediate part 9 interposed between it and the in-setting 5. This part 9, which is in the form of a bush, the cylindrical part of which is guided in the recess 2 so that the said bush can slide axially without rocking, while its base 9a bears on the in-setting 5. To this end, the surface of the latter in contact with the bush has an annular convex bearing surface 10 to reduce friction. Friction is further reduced because the bush 9 is of steel and the outer surface of its base 9a perpendicular to the axis of the bearing and in contact with the bearing surface 10 of the in-setting 5 is polished.

The small mechanism arbor or pivot mounted in the bearing described is denoted by reference 11. Its stem 11a passes through the said bearing and its end situated beyond the bearing carries a pinion 12. The axial movements to which the pivot or arbor may be subject are limited because its front surface 13 abuts the base of the bearing support 1.

The lateral movements of the pivot or arbor 11 are damped—whether said movements are due to shocks or just vibrations—by the spring 7 which constantly tends to return the block to its central position. The maximum lateral movements of the arbor or pivot are limited by the edge of the central aperture 14 formed in the base of the support 1. Provisions could also be made to limit these lateral movements by the side wall of the recess 2 against which the largest-diameter part of the in-setting 5 will abut; this limitation of the lateral movements of the arbor 11 could also be effected by limitation of the axial movements of the bush 9 abutting the cover 8.

The embodiment shown in FIG. 2 differs from the first embodiment in that the arbor or pivot denoted by reference 15 has a stem 15a which passes through the block 4—5 but which does not project from the bearing. Its end abuts an end-jewel 16 fitted into the bushing 17 of the bearing support 1. The end-jewel 16 thus limits the axial movements of the arbor 15. Otherwise the same reference numerals are used in FIG. 2 to denote like parts.

It should be noted that in both the embodiments described the axial stop system for the arbor is quite independent of the block and its return system.

What I claim is:

1. In a shock-absorbing bearing for an arbor of a small mechanism, a bearing block through which the said arbor passes, a bearing support provided with a surface of revolution constituting a seat on which rests the said block, a resilient device, an intermediate member located between the said block and the said resilient device and through the intermediary of which the said resilient device acts on the said block for keeping it applied to the said seat, said intermediate member being provided on the one hand with a cylindrical part by means of which it is guided to be axially slidable without rocking in the said bearing support and, on the other hand, with a plane bearing surface perpendicular to the bearing axis, by which it bears on the said block which thus moves parallel to itself without rocking, and abutting means independent of the said block and of its return system for axial abutment of the said arbor.

2. In a shock-absorbing bearing for an arbor of a small mechanism, a pierced jewel through which the said arbor passes, a setting provided with an annular convex bearing surface, in which is fitted the said jewel, a bearing support provided with a surface of revolution constituting a seat on which rests the said annular convex bearing surface of the said setting, a resilient device, an intermediate member located between the said setting and the said resilient device and through the intermediary of which the said resilient device acts on the said setting for keeping it applied to the said seat, said intermediate member being provided on the one hand with a cylindrical part by means of which it is guided to be axially slidable without rocking in the said bearing support and, on the other hand, with a plane bearing surface perpendicular to the bearing axis, by which it bears on the said setting which thus moves parallel to itself without rocking, and abutting means independent of the said jewel and of its return system for axial abutment of the said arbor.

3. In a shock-absorbing bearing for an arbor of a small mechanism, a bearing block through which the said arbor passes, a bearing support provided with a surface of revolution constituting a seat on which rests the said block, a resilient device, an intermediate member constituted by a bush the base of which is pierced, located between the said block and the said resilient device and through the intermediary of which the said resilient device acts on the said block for keeping it applied to the said seat, said intermediate member being provided on the one hand with a cylindrical part by means of which it is guided to be axially slidable without rocking in the said bearing support and, on the other hand, with a plane bearing surface perpendicular to the bearing axis, by which it bears on the said block which thus moves parallel to itself without rocking, and abutting means independent of the said block and of its return system for axial abutment of the said arbor.

4. In a shock-absorbing bearing for an arbor of a small mechanism, a bearing block through which the said arbor passes, a bearing support provided with a surface of revolution constituting a seat on which rests the said block, a resilient device, an intermediate member located between the said block and the said resilient device and through the intermediary of which the said resilient device acts on the said block for keeping it applied to the said seat, said intermediate member being provided on the one hand with a cylindrical part by means of which it is guided to be axially slidable without rocking in the said bearing support and, on the other hand, with a plane bearing surface perpendicular to the bearing axis, by which it bears on the said block which thus moves parallel to itself without rocking, and a bushing mounted on the said bearing support and forming an axial stop for the end of the said arbor.

References Cited in the file of this patent
FOREIGN PATENTS
1,185,741    France _____ Feb. 10, 1959